United States Patent
McNulty

(10) Patent No.: US 10,443,840 B2
(45) Date of Patent: Oct. 15, 2019

(54) REVERSIBLE DRAFT CONTROLLERS AND EXHAUST SYSTEMS INCORPORATING SAME

(75) Inventor: Timothy Edward McNulty, Dallas, TX (US)

(73) Assignee: RM Manifold Group, Inc., Dallas, TX (US)

( * ) Notice: Subject to any disclaimer, the term of this patent is extended or adjusted under 35 U.S.C. 154(b) by 1319 days.

(21) Appl. No.: 13/469,859

(22) Filed: May 11, 2012

(65) Prior Publication Data

US 2012/0289138 A1    Nov. 15, 2012

Related U.S. Application Data

(60) Provisional application No. 61/485,474, filed on May 12, 2011.

(51) Int. Cl.
| | | |
|---|---|---|
| F23L 17/00 | (2006.01) | |
| F23J 11/12 | (2006.01) | |
| F04D 27/00 | (2006.01) | |

(52) U.S. Cl.
CPC ............ *F23L 17/00* (2013.01); *F04D 27/004* (2013.01); *F23J 11/12* (2013.01)

(58) Field of Classification Search
CPC ............................... F04D 27/004; F23L 17/00
USPC ................................ 454/15–17, 20
See application file for complete search history.

(56) References Cited

U.S. PATENT DOCUMENTS

| | | | | |
|---|---|---|---|---|
| 1,915,101 A | * | 6/1933 | Peebles | F23N 3/02 |
| | | | | 236/14 |
| 2,001,001 A | * | 5/1935 | Thelen | 34/191 |
| 2,229,350 A | * | 1/1941 | Smith | F23N 1/02 |
| | | | | 110/189 |
| 3,106,175 A | * | 10/1963 | Anderson | F23L 17/00 |
| | | | | 236/45 |
| 3,926,101 A | * | 12/1975 | Moss | 454/229 |

(Continued)

FOREIGN PATENT DOCUMENTS

WO          WO86/04663 A1 *    8/1986

OTHER PUBLICATIONS

Basten, WO86/04663A1 English machine translation, Aug. 14, 1986 (Year: 1986).*

*Primary Examiner* — Kenneth Rinehart
*Assistant Examiner* — Phillip Decker
(74) *Attorney, Agent, or Firm* — Lathrop Gage L.L.P.

(57) ABSTRACT

Reversible draft controllers and exhaust systems incorporating reversible draft controllers are disclosed. One system for controlling draft in a chimney includes a sensor for determining condition data, an axial fan blade, an electronically commutated motor (ECM), and a controller. The ECM is configured to rotate the fan blade in a first direction to increase draft in the chimney and in a second, opposite direction to decrease draft. The controller has a processor and a program of instructions executable by the processor to perform steps for controlling draft in the chimney with the fan blade. The steps include: comparing condition data from the sensor to set point data to determine if an intervention is required; addressing insufficient draft by actuating the ECM to rotate the axial fan blade in the first direction; and addressing excessive draft by actuating the ECM to rotate the fan blade in the second direction.

20 Claims, 2 Drawing Sheets

(56) References Cited

U.S. PATENT DOCUMENTS

| | | | | |
|---|---|---|---|---|
| 4,195,778 A * | 4/1980 | Hyten | .................... | F24B 1/1886 126/502 |
| 4,251,025 A * | 2/1981 | Bonne | ..................... | F23N 1/065 236/14 |
| 4,765,231 A * | 8/1988 | Aniello | ......................... | 454/239 |
| 5,269,076 A * | 12/1993 | Breckenridge | ................. | 34/413 |
| 5,375,651 A * | 12/1994 | Colwell | ..................... | 454/16 |
| 5,418,438 A * | 5/1995 | Hollenbeck | ................... | 318/432 |
| 5,557,182 A * | 9/1996 | Hollenbeck et al. | ......... | 318/432 |
| 5,791,332 A * | 8/1998 | Thompson | ............. | F23N 1/062 126/116 A |
| 5,860,858 A * | 1/1999 | Wettergren | .................... | 454/16 |
| 5,993,195 A * | 11/1999 | Thompson | ............. | F23N 1/067 126/116 A |
| 6,257,870 B1 * | 7/2001 | Hugghins | ............... | F23N 3/082 126/116 A |
| RE37,576 E * | 3/2002 | Stephens et al. | .......... | 310/254.1 |
| 6,726,111 B2 * | 4/2004 | Weimer | ............... | F24F 11/0001 236/51 |
| 2004/0185770 A1 * | 9/2004 | Soeholm | ................. | F23N 3/002 454/239 |
| 2007/0209653 A1 * | 9/2007 | Beisheim et al. | .............. | 126/80 |
| 2009/0044794 A1 * | 2/2009 | Hugghins | ............... | F23N 3/002 126/116 A |
| 2009/0215375 A1 * | 8/2009 | Hagensen | ....................... | 454/42 |
| 2010/0045228 A1 * | 2/2010 | Rollins | ................... | F04D 19/00 700/280 |
| 2010/0193163 A1 * | 8/2010 | Rollins | ................... | F04D 15/00 165/121 |
| 2014/0127632 A1 * | 5/2014 | Garrison | ............... | F23L 17/005 431/20 |
| 2016/0238014 A1 * | 8/2016 | Liu | ....................... | F04D 19/005 |
| 2018/0058463 A1 * | 3/2018 | Rollins | ............... | F04D 25/0606 |
| 2018/0112669 A1 * | 4/2018 | Bhutani | ............... | F04D 27/004 |

\* cited by examiner

REVERSIBLE DRAFT CONTROLLERS AND EXHAUST SYSTEMS INCORPORATING SAME

CROSS-REFERENCE TO RELATED APPLICATIONS

This application claims priority to U.S. Patent Application No. 61/485,474, filed May 12, 2011, which is incorporated herein by reference in its entirety.

BACKGROUND

For chimney systems to work effectively, maintaining certain pressures may be required. In various prior art chimney systems with significant vertical and lateral runs, a draft inducer is included for low-draft situations, and an over-draft damper is included for reducing draft once the chimney has been primed and excessive draft pressures are generated. A controller uses a first feedback loop—often a proportional-integral-derivative (or "PID") loop—to operate the draft inducer, and uses a second feedback loop—again, often a PID loop—to operate the damper. If pressure in the chimney is excessively positive, the controller increases the speed of the draft inducer to offset the excessive positive pressure. However, if the chimney system becomes excessively negative, the controller switches PID loop control to operate the damper, which baffles flue gas to reduce the excessive negative pressure.

Limitations may exist in such prior art systems. For example, the draft inducer, the damper, hardware for each PID loop, and software for each PID loop may introduce initial, operational, and maintenance costs to each system. Further, the components may collectively require a relatively large amount of space in the prior art systems. In various embodiments of the current invention, these and/or other limitations may be overcome or reduced.

Reversible draft controllers and exhaust systems incorporating reversible draft controllers are provided herein.

SUMMARY

Reversible draft controllers and exhaust systems incorporating reversible draft controllers are disclosed. In one embodiment, a system for controlling draft in a chimney includes a sensor for determining condition data relating to the draft in the chimney, an axial fan blade; an electronically commutated motor (ECM), and a controller. The ECM is configured to rotate the axial fan blade in a first direction to increase the draft in the chimney and to rotate the axial fan blade in a second direction (opposite to the first direction) to decrease the draft in the chimney. The controller has a processor and a program of instructions executable by the processor to perform method steps for controlling the draft in the chimney with the axial fan blade. The method steps include: (a) comparing condition data from the sensor to set point data to determine if an intervention is required; (b) addressing insufficient draft in the chimney by actuating the ECM to rotate the axial fan blade in the first direction; and (c) addressing excessive draft in the chimney by actuating the ECM to rotate the axial fan blade in the second direction.

In another embodiment, a program storage device readable by a machine, tangibly embodying a program of instructions executable by the machine to perform method steps for regulating an amount of draft in a chimney, is disclosed. The method steps include: receiving condition data indicating an amount of the draft; accessing from a database stored data comprising set point data; determining if an intervention is needed based on a comparison of the condition data to the set point data; addressing insufficient draft; and addressing excess draft. Insufficient draft is addressed by each of: (a) causing an axial fan blade to rotate in a first direction, the axial fan blade previously rotating in a second direction opposite the first direction or being stationary; (b) causing the axial fan blade to rotate faster in the first direction; and (c) causing the axial fan blade to decrease speed of rotation in the second direction. Excess draft is addressed by each of: (d) causing the axial fan blade to rotate in the second direction, the axial fan blade previously rotating in the first direction or being stationary; (e) causing the axial fan blade to rotate faster in the second direction; and (f) causing the axial fan blade to decrease speed of rotation in the first direction.

DETAILED DESCRIPTION

Figure 1:
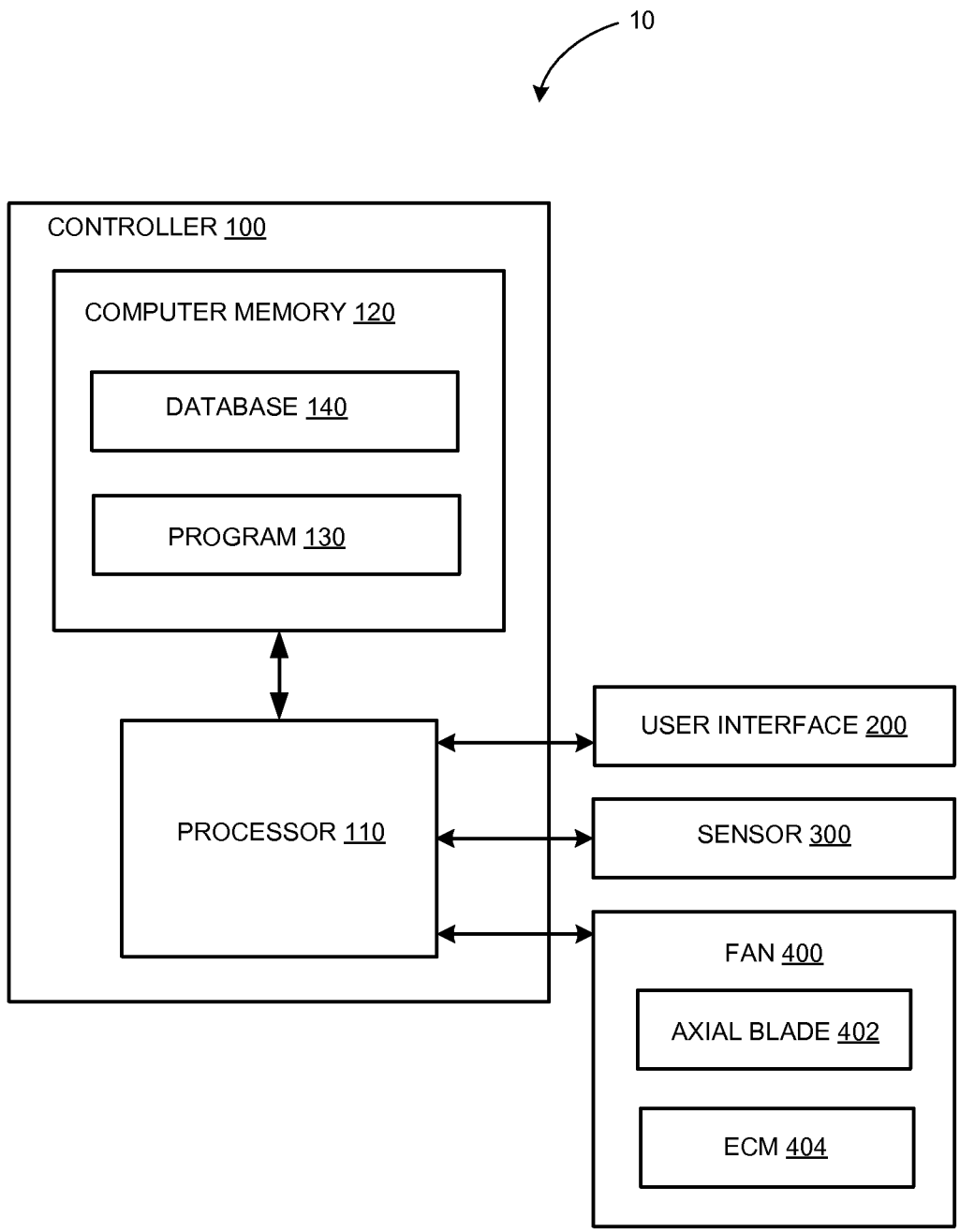
FIG. 1 shows an exhaust system incorporating a reversible draft controller, according to one embodiment of the invention.
Figure 2:
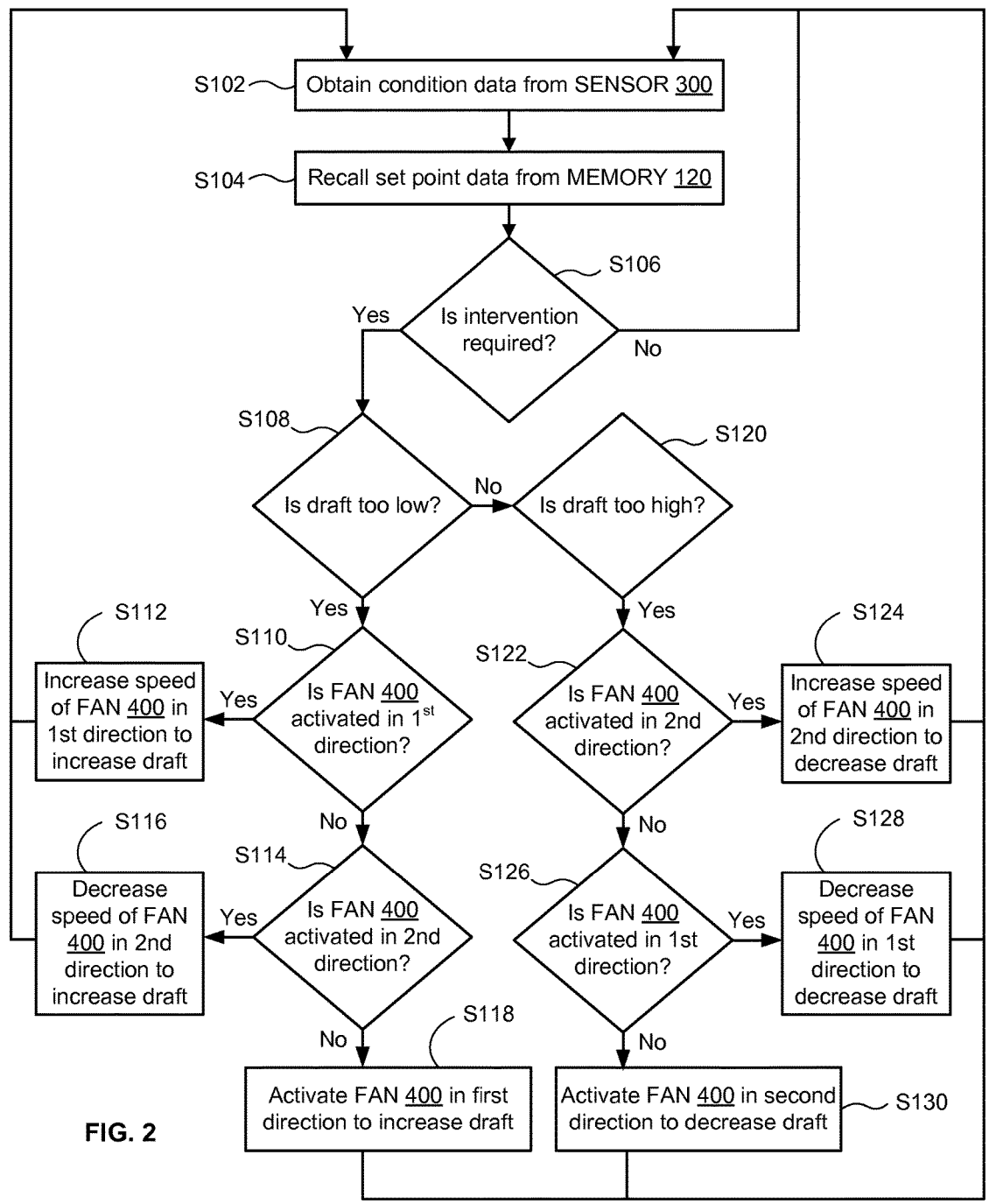
FIG. 2 shows an exemplary set of steps performed by the reversible draft controller of FIG. 1.

FIGS. 1 and 2 illustrate a reversible draft controller 100 and an exhaust system 10 using the reversible draft controller 100, according to one embodiment. Apart from the reversible draft controller 100, the system 10 includes a user interface 200, a sensor 300 monitoring draft in a chimney, and a draft inducer (or "fan") 400. Very notably, a separate dampener is not required.

The draft inducer 400 includes an axial fan blade 402 and an electronically commutated motor (or "ECM") 404. The user interface 200 may include an input (e.g., keyboard, touchscreen, etc.) and an output (e.g., visual display, audible alarm, etc.), and in some embodiments the user interface 200 may be permanently in data communication with, and local to, the controller 100. In other embodiments, the user interface 200 may be selectively in data communication with the controller 100; for example, the user interface 200 may be a laptop or tablet computer that may be selectively placed in data communication with the controller 100. Moreover, the user interface 200 may be remotely in data communication with the controller 100, such as through a network (e.g., the Internet, a telephone network, etc.).

Focusing on the reversible draft controller 100, the controller 100 includes a processor 110 in data communication with non-transitory computer memory 120 having programming 130 and a database 140. As will be appreciated by those skilled in the art, the computer memory 120 may consist of any appropriate computer-storage media (e.g., RAM, ROM, EEPROM, flash memory, etc.) and the database 140 may be any electronic file or combination of electronic files in which data is stored for use by the processor 110.

The programming 130 causes the processor 110 to undertake various steps for controlling the fan 400 to both increase and decrease draft, such as shown in FIG. 2. Those skilled in the art will appreciate that various steps shown and described can occur in different orders, and that some steps may be omitted or combined.

At step S102 of FIG. 2, the processor 110 obtains condition data from the sensor 300 about draft in a chimney. The programming then proceeds to step S104, where the processor 110 obtains set point data (i.e., data regarding target draft in the chimney) from the memory 120 (e.g., from the database 140). At step S106, the processor 110 determines whether intervention is required by comparing the condition data from the sensor 300 (from step S102) to the set point data from the memory 120 (from step S104). The set point data may be a range of acceptable draft levels, or may include a particular set point with or without an acceptable margin. If the draft in the chimney is at the set point or within an acceptable margin around the set point, intervention is not required and the programming 130 directs the processor 110 back to step S102. If intervention is needed, the programming instead directs the processor 110 to step S108.

At step S108, the processor 110 determines if the draft in the chimney is too low, using the set point data and the condition data. If so, the processor 110 continues to step S110; if not, the processor 110 proceeds to step S120.

At step S108, the processor 110 determines if the fan 400 is already activated in a first direction that increases draft in the chimney. This determination may be made by maintaining (e.g., in the memory 120) and querying a status of the fan 400, and/or by analyzing data from the fan 400 (e.g., the ECM 404) or a sensor associated with the fan 400. If the processor 110 determines at step S110 that the fan 400 is already activated, the processor 110 may increase the speed of the fan 400 in the first direction to increase the draft at step S112. The amount of increase in fan speed may be incremental, or may be proportional to (or otherwise associated with) the amount of additional draft needed. It may be particularly desirable to use PID algorithms to calculate the amount of increase in fan speed. From step S112, the processor 110 is directed to return to step S102.

If the processor 110 determined at step S110 that the fan 400 was not already activated in the first direction, the processor 110 turns to step S114 and determines if the fan 400 is already activated in a second direction that decreases draft in the chimney. As noted above, the determination of whether the fan 400 is activated may be made in various ways. For example, a status of the fan 400 may be maintained and queried, and/or data from the fan 400 (e.g., the ECM 404) or a sensor associated with the fan 400 may be analyzed. If the fan 400 is already activated in the second direction, the processor 110 (at step S116) may decrease the speed of the fan 400 in the second direction to increase the amount of draft in the chimney. The amount of decrease in fan speed may be incremental, or may be proportional to (or otherwise associated with) the amount of additional draft needed. It may be particularly desirable to use PID algorithms to calculate the amount of decrease in fan speed. From step S116, the processor 110 is directed to return to step S102.

If the processor 110 determined at step S114 that the fan 400 is not already activated in the second (i.e., dampening) direction, the processor 110 may activate the fan 400 at step S118 in the first (i.e., draft-inducing) direction. Similar to step S110, the speed of the fan 400 in the first direction may be incrementally adjusted (e.g., to a first setting) or proportionally adjusted at step S118. The programming 130 directs the processor 110 from step S118 to step S102.

Looking now at step S120, which occurs if the processor 110 determines that the draft in the chimney is not too low at step S108, the processor 110 determines if the draft in the chimney is too high. Because the processor 110 has already determined that intervention is required (at step S106) and that the draft is not too low (at step S108), it may be automatically determined at step S120 that the draft in the chimney is too high. The processor 110 proceeds from step S120 to step S122.

At step S122, the processor 110 determines whether the fan 400 is already activated in the second (i.e., dampening) direction. Analysis at step S122 generally corresponds to that at step S114 discussed above. If the processor 110 determines at step S122 that the fan 400 is already activated in the second direction, the processor 110 may increase the speed of the fan 400 in the second direction to decrease the draft at step S124. The amount of increase in fan speed may be incremental, or may be proportional to (or otherwise associated with) the amount of additional dampening needed. It may be particularly desirable to use PID algorithms to calculate the amount of increase in fan speed. From step S124, the processor 110 is directed to return to step S102.

If the processor 110 determined at step S122 that the fan 400 was not already activated in the second direction, the processor 110 turns to step S126 and determines if the fan 400 is already activated in the first direction. As noted above, the determination of whether the fan 400 is activated may be made in various ways. If the fan 400 is already activated in the first direction, the processor 110 (at step S128) may decrease the speed of the fan 400 in the first direction to decrease the amount of draft in the chimney. The amount of decrease in fan speed may be incremental, or may be proportional to (or otherwise associated with) the amount of additional dampening needed. It may be particularly desirable to use PID algorithms to calculate the amount of decrease in fan speed. From step S128, the processor 110 is directed to return to step S102.

If the processor 110 determined at step S126 that the fan 400 is not already activated in the first (i.e., draft-inducing) direction, the processor 110 may activate the fan 400 at step S130 in the second (i.e., dampening) direction. Similar to step S110, the speed of the fan 400 in the second direction may be incrementally adjusted (e.g., to a first setting) or proportionally adjusted at step S130. The programming 130 directs the processor 110 from step S130 to step S102.

In some embodiments, steps S114, S116, S126, and S128 (for example) may be omitted, such that the fan 400 is automatically rotated in the first direction when additional draft is needed in the chimney, and automatically rotated in the second direction when additional dampening is needed. Omission may be complete (such that steps do not appear in the programming 130), or may be triggered upon various events. For example, if the processor 110 determines at step S108 that the draft is extremely too low, steps S114 and S116 may be temporarily skipped. And in any event, steps S102 and S104, steps S108 and S120, steps S110 and S114, steps S122 and S126 may be respectively interchanged (e.g., such that step S104 occurs before step S102, etc.).

Additionally, the programming 130 may include instructions causing the ECM 404 and/or sensors associated with the fan 400 to be periodically or continuously monitored by the processor 110 to verify that the fan 400 is operating correctly, and the processor 110 may send alerts (e.g., to the user interface 200) if the fan 400 is operating outside of set parameters.

Those skilled in the art will appreciate that the controllers and systems set forth herein may be used in exhaust systems with various degrees of precision and tolerance. As an example, chimney pressure may be maintained in a bi-directional manner +/−0.25" WC.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. The specific configurations and contours set forth in the accompanying drawings are illustrative and not limiting.

The invention claimed is:

1. A system for controlling draft in a chimney, comprising:
   a sensor for determining condition data relating to the draft in the chimney;
   an axial fan blade;
   an electronically commutated motor (ECM) configured to rotate the axial fan blade in a first direction to increase the draft in the chimney and to rotate the axial fan blade in a second direction to decrease the draft in the chimney, the second direction being opposite to the first direction; and
   a controller having a processor and a program of instructions executable by the processor to perform method steps for controlling the draft in the chimney with the axial fan blade, the method steps comprising:
     (a) comparing condition data relating to the draft in the chimney from the sensor to set point data to determine if the draft in the chimney is outside a predetermined amount of draft such that the draft in the chimney is insufficient or excessive;
     (b) addressing insufficient draft in the chimney by actuating the ECM to rotate the axial fan blade in the first direction; and
     (c) addressing excessive draft in the chimney by actuating the ECM to rotate the axial fan blade in the second direction.

2. The system of claim 1, further comprising a user interface in data communication with the processor.

3. The system of claim 2, wherein the user interface is in data communication with the processor through a network.

4. The system of claim 2, wherein the user interface includes an audible alarm.

5. The system of claim 1, wherein the set point data includes a range of acceptable draft levels.

6. The system of claim 1, wherein the set point data includes a particular set point with an acceptable margin.

7. The system of claim 1, wherein the set point data includes a particular set point without an acceptable margin.

8. The system of claim 1, wherein the program of instructions further includes method steps for monitoring function of the ECM using data obtained by the processor from the sensor.

9. A program storage device readable by a machine, tangibly embodying a program of instructions executable by the machine to perform method steps for regulating an amount of draft in a chimney, the method steps comprising:
   receiving condition data indicating an amount of the draft;
   accessing from a database stored data comprising set point data;
   comparing the condition data to the set point data to identify insufficient draft and excess draft;
   selecting between the steps:
     (a) causing an axial fan blade to rotate in a first direction, the axial fan blade previously rotating in a second direction opposite the first direction or being stationary;
     (b) causing the axial fan blade to increase speed of rotation in the first direction; and
     (c) causing the axial fan blade to decrease speed of rotation in the second direction;
   to address insufficient draft, and implementing the selected step to address insufficient draft; and
   selecting between the steps:
     (d) causing the axial fan blade to rotate in the second direction, the axial fan blade previously rotating in a second direction opposite the first direction or being stationary;
     (e) causing the axial fan blade to increase speed of rotation in the second direction; and
     (f) causing the axial fan blade to decrease speed of rotation in the first direction;
   to address excess draft, and implementing the selected step to address excess draft.

10. The program storage device of claim 9, wherein the axial fan blade is rotated by an electronically commutated motor.

11. The program storage device of claim 9, wherein the set point data includes a range of acceptable draft levels.

12. The program storage device of claim 9, wherein the set point data includes a particular set point with an acceptable margin.

13. The program storage device of claim 9, wherein the set point data includes a particular set point without an acceptable margin.

14. The program storage device of claim 9, wherein:
   the step of:
     (b) causing the axial fan blade to increase speed of rotation in the first direction;
   is more particularly:
     (b1) causing the axial fan blade to incrementally increase speed of rotation in the first direction.

15. The program storage device of claim 14, wherein:
   the step of:
     (c) causing the axial fan blade to decrease speed of rotation in the second direction;
   is more particularly:
     (c1) causing the axial fan blade to incrementally decrease speed of rotation in the second direction.

16. The program storage device of claim 15, wherein:
   the step of:
     (e) causing the axial fan blade to increase speed of rotation in the second direction; and
   is more particularly:
     (e1) causing the axial fan blade to incrementally increase speed of rotation in the second direction.

17. The program storage device of claim 16, wherein:
   the step of:
     (f) causing the axial fan blade to decrease speed of rotation in the first direction;
   is more particularly:
     (f1) causing the axial fan blade to incrementally decrease speed of rotation in the first direction.

18. The program storage device of claim 17, wherein the set point data includes a range of acceptable draft levels.

19. The program storage device of claim 17, wherein the set point data includes a particular set point with an acceptable margin.

20. The program storage device of claim 17, wherein the set point data includes a particular set point without an acceptable margin.

\* \* \* \* \*